(12) United States Patent
Oroskar

(10) Patent No.: US 8,483,699 B1
(45) Date of Patent: Jul. 9, 2013

(54) CODEC SELECTION FOR WIRELESS COMMUNICATION

(75) Inventor: Siddharth S. Oroskar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 13/598,042

(22) Filed: Aug. 29, 2012

(51) Int. Cl.
| | |
|---|---|
| H04W 72/00 | (2009.01) |
| H04B 7/00 | (2006.01) |
| H04B 1/38 | (2006.01) |
| H04M 11/00 | (2006.01) |
| H04L 12/26 | (2006.01) |
| H04J 3/22 | (2006.01) |

(52) U.S. Cl.
USPC ........... 455/450; 455/509; 455/405; 455/574; 370/252; 370/230; 370/468

(58) Field of Classification Search
USPC .............. 455/405, 574, 450, 509, 464, 452.1, 455/432.1, 436; 370/252, 203, 468, 235, 370/331, 230
See application file for complete search history.

(56) References Cited

U.S. PATENT DOCUMENTS

| | | |
|---|---|---|
| 6,798,786 B1 | 9/2004 | Lo et al. |
| 7,693,526 B2 | 4/2010 | Qian et al. |
| 7,768,998 B1 | 8/2010 | Everson et al. |
| 7,873,074 B1 * | 1/2011 | Boland ......................... 370/468 |
| 2003/0063569 A1 * | 4/2003 | Kalliokulju et al. .......... 370/252 |
| 2004/0008627 A1 | 1/2004 | Garg et al. |
| 2005/0261899 A1 | 11/2005 | Brueck et al. |
| 2005/0288018 A1 * | 12/2005 | Huang et al. .................. 455/436 |
| 2006/0174015 A1 | 8/2006 | Arauz-Rosado |
| 2007/0043558 A1 | 2/2007 | Schwarz et al. |
| 2009/0209300 A1 * | 8/2009 | Furbeck ........................ 455/574 |
| 2009/0227277 A1 | 9/2009 | Gupta et al. |

OTHER PUBLICATIONS

"Enhanced Variable Rate Codec, Speech Service Options 3, 68, 70, and 73 for Wideband Spread Spectrum Digital Systems," 3GPP2 C.S0014-D, Version 1, pp. 1-1 through 9-24 (May 2009).
CouthIT, "EVRC-A," 1 page, May 18, 2012 (www.couthit.com/codec-evrc.asp).
CouthIT, "EVRC-B," 1 page, May 18, 2012 (www.couthit.com/codec-evrc-b.asp).
CouthIT, "EVRC-NW," 2 pages, May 18, 2012 (www.couthit.com/codec-evrc-nw.asp).
CouthIT, "EVRC-C, EVRC-WB," 2 pages, May 18, 2012 (www.couthit.com/codec-evrc-wb.asp).
Desineni et al., "RTP Payload Format for the Enhanced Variable Rate Wideband Codec (EVRC-WB) and the Media Subtype Updates for EVRC-B Codec," Network Working Group, pp. 1-25 (Feb. 2008).

\* cited by examiner

*Primary Examiner* — Vladimir Magloire
*Assistant Examiner* — Michael Mapa

(57) ABSTRACT

A radio access network (RAN) device may receive a call setup request from a wireless communication device (WCD) seeking to set up a call. In response to receiving the call setup request, it may be determined that (i) the WCD is capable of conducting the call using either a first codec or a second codec, (ii) the first codec is capable of using a sampling rate of over 8,000 Hz, and (iii) the second codec uses sampling rates of 8,000 Hz or less. Based at least on this determination, the WCD may be instructed to set up the call using the second codec.

18 Claims, 6 Drawing Sheets

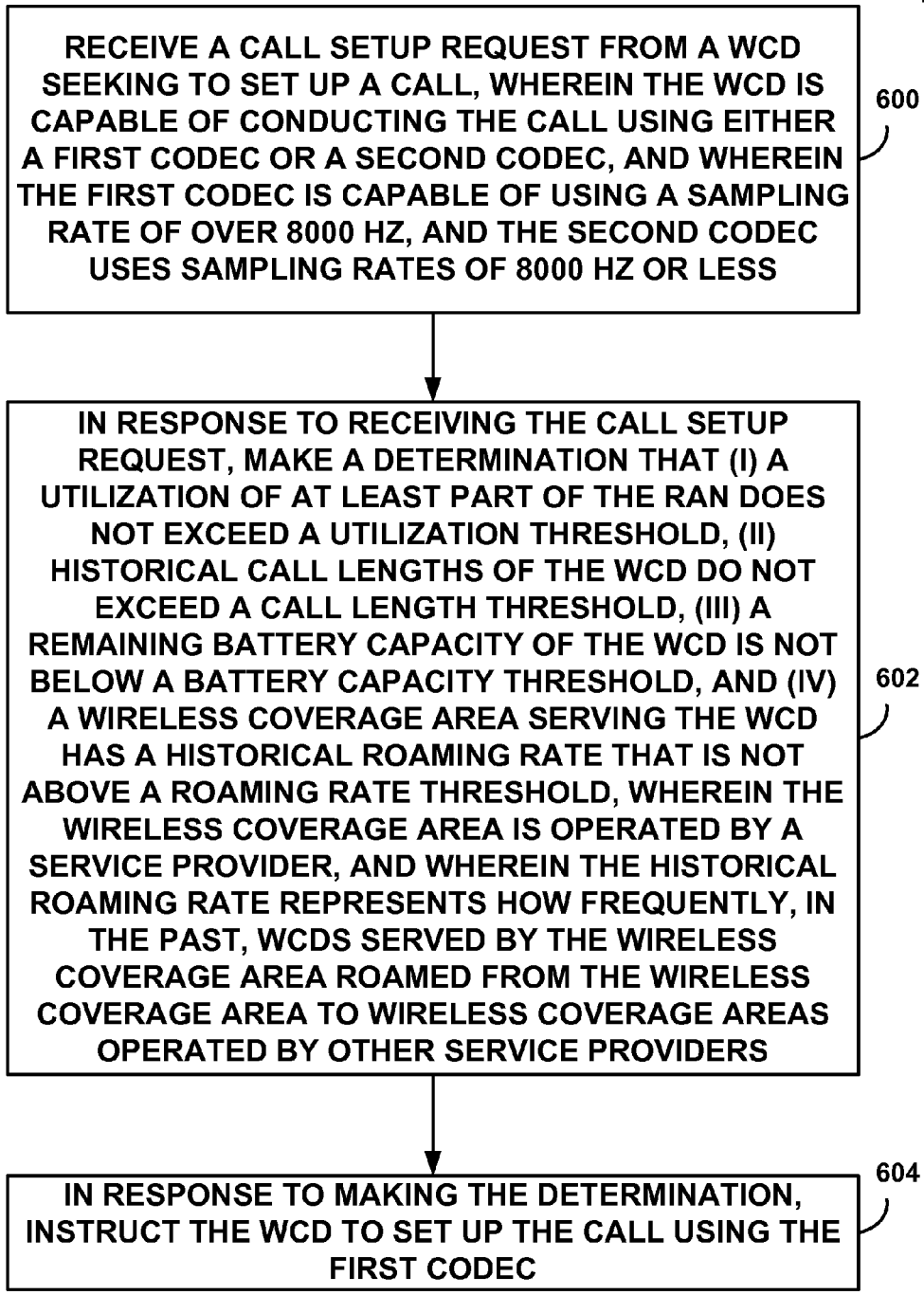

CODEC SELECTION FOR WIRELESS COMMUNICATION

BACKGROUND

Wireless service providers typically design their wireless networks to comprise a number of partially-overlapping wireless coverage areas. A radio access network (RAN) may allocate resources from these wireless coverage areas to wireless communication devices (WCDs) so that these WCDs can communicate using the resources. For certain types of communication, such as voice calls, video calls, and/or other types of calls, the WCDs may be able to use two or more different types of codecs when engaging in such communication. However, each codec may have different characteristics that impact the extent of resources used when the WCDs are communicating.

OVERVIEW

WCDs may support various types of codecs. These codecs may define how media content (e.g., voice, music, still images, and/or video) are encoded and decoded. Different codecs may have different features. For instance, a voice codec used by a WCD might encode and decode digital voice at a rate of 1-15 kilobits per second. However, to achieve these bit rates, some of the information present in an input analog voice signal (e.g., high-frequency spectral components) may be lost when digitized. Thus, codec design can be a tradeoff between achieving a low bit rate for a particular type of media (which is desirable to conserve network and storage capacity) and the user-perceived quality of the media produced by the codec.

In general, there may be a roughly linear relationship between codec bit rate and the media quality that the codec produces at that bit rate. For example, a voice codec operating at 9.6 kilobits per second is likely to produce better quality voice than a voice codec operating at 4.8 kilobits per second. However, as codec technologies advance, new codecs may be introduced that are capable of supporting equal or better media quality at a lower bit rate. Thus, in some cases, a voice codec that operates at 8.5 kilobits per second may produce better voice quality than another voice codec operating at 9.6 kilobits per second.

Wireless networks allocate various types of resources to WCDs in order for the WCDs to communicate. These resources may include various aspects of frequencies, time slots, and/or code-division multiple access (CDMA) codes, etc. Since wireless spectrum is limited, it may benefit wireless network operators to allocate wireless resources judiciously.

Additionally, WCDs may be powered by battery. Some codecs, such as the codecs that support higher-quality media, may require more processing power than other codecs that support lower-quality media. Thus, some codecs may drain WCD battery capacity faster than other codecs.

Therefore, when multiple codecs are supported by a particular WCD, a RAN may be configured to consider various factors when determining which codec the WCD should use during a call. These factors may include each supported codec's potential impact on the RAN and the WCD.

Accordingly, in a first embodiment, a RAN device may receive a call setup request from a WCD seeking to set up a call. In response to receiving the call setup request, it may be determined that the WCD is capable of conducting the call using either a first codec or a second codec. It may be further determined that the first codec is capable of using a sampling rate of over 8,000 Hz, and the second codec uses sampling rates of 8,000 Hz or less. Based at least on the WCD being capable of conducting the call using either the first codec or the second codec, the first codec being capable of using the sampling rate of over 8,000 Hz, and the second codec using sampling rates of 8,000 Hz or less, the WCD may be instructed to set up the call using the second codec.

A codec that is capable of using a sampling rate of over 8,000 Hz may support modes of operation in which high-frequency audio components are represented. While in one of these modes of operation, this type of codec may exhibit higher bit rates that potentially consume more RAN resources and/or WCD battery capacity than codecs that use sampling rates of 8,000 Hz or less. Accordingly, if RAN resources and/or WCD battery resources are scarce, it may be beneficial for the RAN to instruct the WCD to use a codec that doesn't support a sampling rate of over 8,000 Hz.

In a second example embodiment, a RAN device may receive a call setup request from a WCD seeking to set up a call. The WCD may be capable of conducting the call using either a first codec or a second codec, where the first codec is capable of using a sampling rate of over 8,000 Hz, and the second codec uses sampling rates of 8,000 Hz or less. In response to receiving the call setup request, a determination may be made that (i) a utilization of at least part of the RAN does not exceed a utilization threshold, (ii) historical call lengths of the WCD do not exceed a call length threshold, (iii) a remaining battery capacity of the WCD is not below a battery capacity threshold, and (iv) a wireless coverage area serving the WCD has a historical roaming rate that is not above a roaming rate threshold. The wireless coverage area may be operated by a service provider, and the historical roaming rate may represent how frequently, in the past, WCDs served by the wireless coverage area roamed from the wireless coverage area to wireless coverage areas operated by other service providers. In response to making the determination, the WCD may be instructed to set up the call using the first codec.

Each of these example embodiments may also be applied to select a codec to assign to a WCD that is intended to receive an incoming call.

A third example embodiment may include a non-transitory computer-readable storage medium, having stored thereon program instructions that, upon execution by a RAN device, cause the RAN device to perform operations in accordance with the first and/or second example embodiments.

A fourth example embodiment may include a RAN device, comprising at least a processor and data storage. The data storage may contain program instructions that, upon execution by the processor, operate in accordance with the first and/or second example embodiments.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

BRIEF DESCRIPTION OF THE DRAWINGS

FIG. 6 is another flow chart, in accordance with an example embodiment.

DESCRIPTION

I. Network Architecture

Figure 1:
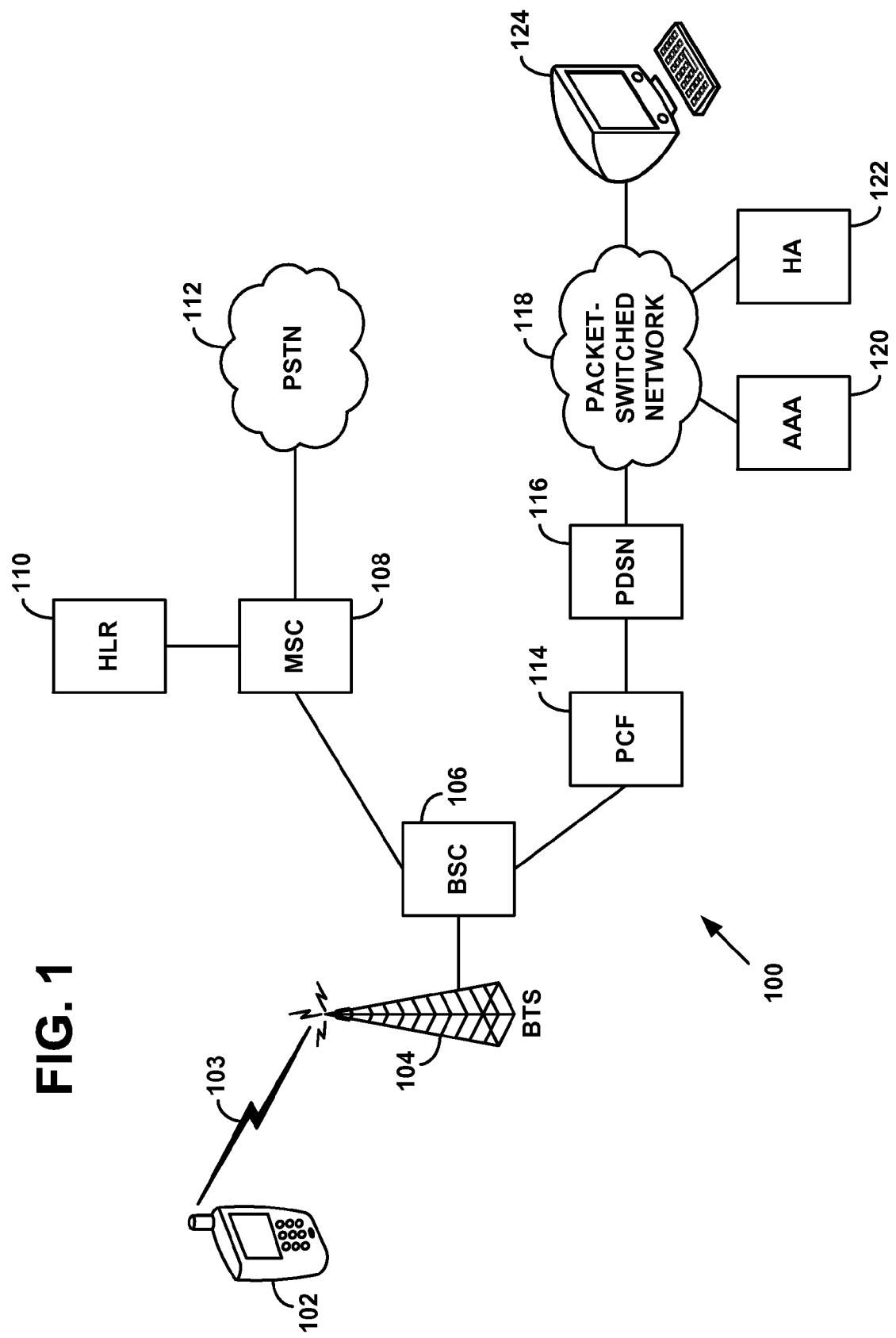
FIG. 1 depicts a RAN, in accordance with an example embodiment.

FIG. 1 shows a simplified block diagram of a wireless communication system 100 in which example embodiments can be employed. WCD 102 may communicate over an air interface 103 with a base transceiver station (BTS) 104, which is, in turn, coupled to or integrated with a base station controller (BSC) 106. Transmissions over air interface 103 from BTS 104 to WCD 102 may represent a "forward link" to the WCD. Conversely, transmissions over air interface 103 from WCD 102 to BTS 104 may represent a "reverse link" from the WCD.

BSC 106 may be connected to a mobile switching center (MSC) 108. BSC 106, MSC 108, or both, may act to control assignment of air interface traffic channels to WCDs, and may provide access to wireless circuit-switched services such as circuit-voice and circuit-data services. As represented by its connection to publically-switched telephone network (PSTN) 112, MSC 108 may also be coupled with one or more other MSCs or other telephony circuit switches, thereby supporting user mobility across MSC regions, as well as local and long-distance landline telephone services. A home location register (HLR) 110, which may be connected to MSC 108, may support mobility-related aspects of subscriber services, including dynamic tracking of subscriber registration location and verification of service privileges.

As shown, BSC 106 may also be connected with a packet-data serving node (PDSN) 116 by way of a packet control function (PCF) 114. PDSN 116, in turn, provides connectivity with a packet-switched network 118, such as the Internet and/or a wireless carrier's private core packet-network. Nodes on network 118 may include, by way of example, an authentication, authorization, and accounting (AAA) server 120, a mobile-IP home agent (HA) 122, and a remote computer 124. After acquiring a traffic channel over air interface 103, WCD 102 may transmit a request to PDSN 116 for a connection to the packet data network. Then, following authentication of WCD 102 by AAA server 120, WCD 102 may be assigned an IP address by the PDSN or by HA 122, and may thereafter engage in packet-data communications with entities such as remote computer 124.

In some deployments, the combination of elements including BTS 104, BSC 106, and MSC 108 may be referred to as a RAN. However, a RAN may contain more or fewer elements. For instance, some RANs may also include HLR 110, PCF 114, PDSN 116, and/or other elements not shown in FIG. 1.

Figure 2:
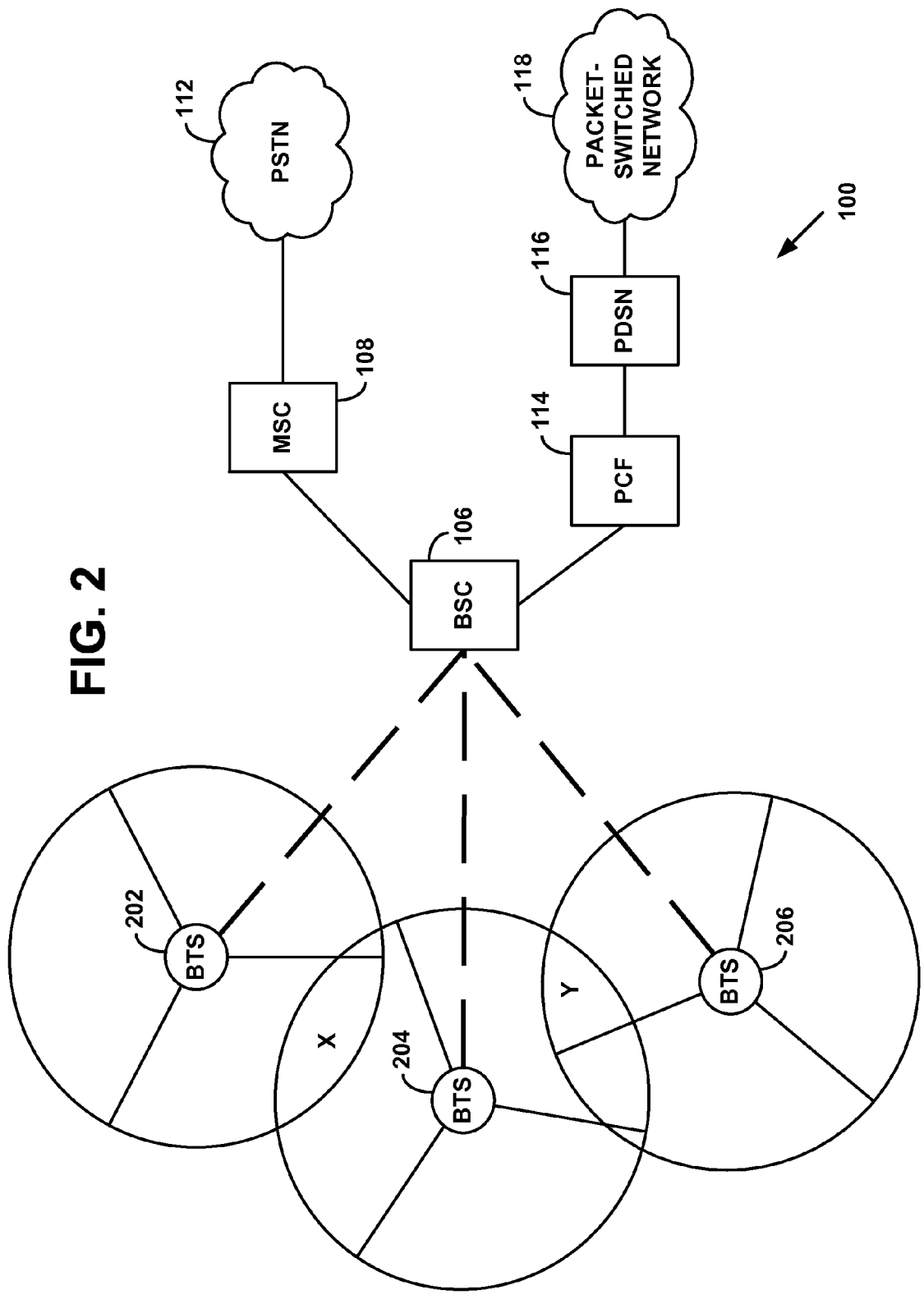
FIG. 2 depicts a RAN radiating to define several wireless coverage areas, in accordance with an example embodiment.

In practice, a BSC may serve multiple BTSs, each of which may then radiate to define a wireless coverage area. Each wireless coverage area, in turn, may comprise a plurality of wireless coverage areas. This arrangement is illustrated in FIG. 2, which shows BSC 106 in network 100 coupled with BTSs 202, 204, and 206. Each BTS is shown at the core of a respective circle representing a wireless coverage area, and each wireless coverage area is divided into three pie-shaped pieces representing wireless coverage areas. With this arrangement, a WCD may operate in any of the wireless coverage areas and can connect, via a serving BTS, with MSC 108 for circuit-based services and/or via PCF 114 and PDSN 116 for packet-based services. Note that the depiction of three wireless coverage areas for each of the BTSs in FIG. 2 is intended to be for purposes of example, and other numbers of wireless coverage areas per BTS are possible. Further, the relative positions of the BTSs and the relative angular orientations of the wireless coverage areas are also illustrative, and other arrangements may be used. Moreover, wireless coverage areas need not be circular, and may take on other shapes and arrangements instead.

A WCD may receive the same bearer data simultaneously from more than one wireless coverage area. To illustrate that point, FIG. 2 includes points X and Y. While in the vicinity of point X, a WCD may be able to receive signals from wireless coverage areas of BTS 202 and BTS 204. Similarly, while in the vicinity of point Y, a WCD may be able to receive signals from wireless coverage areas of BTS 204 and BTS 206. It should be noted that, in practice, a WCD located at or near points X or Y may be able to receive signals (and therefore simultaneously receive the same bearer data) from more than two wireless coverage areas.

In general, the depictions of both FIGS. 1 and 2 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting with respect to the present invention. For instance, BSC 106 may be replaced by one or more radio network controllers (RNCs), and MSC 108 may be replaced, in whole or in part, by one or more softswitch and/or media gateway components.

Figure 3:
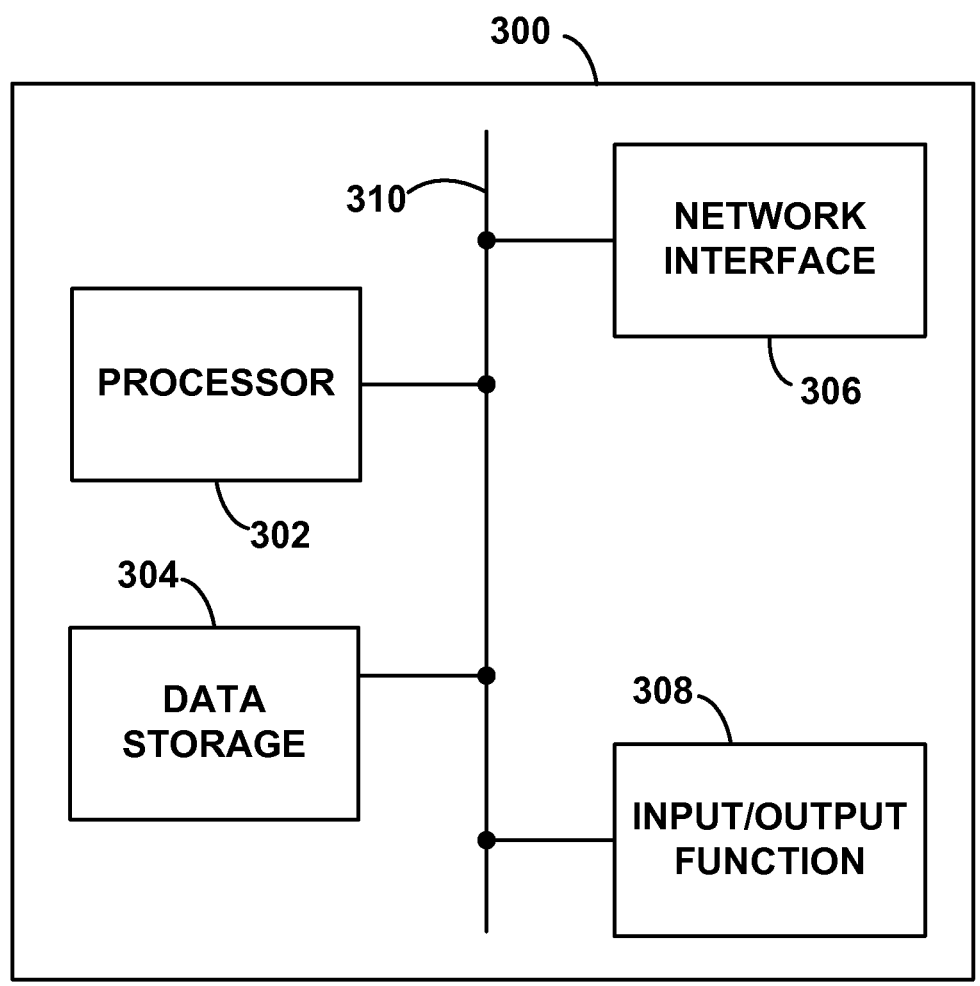
FIG. 3 is a block diagram of a RAN device, in accordance with an example embodiment.

FIG. 3 is a simplified block diagram exemplifying a RAN device 300, illustrating some of the functional components that could be included in a RAN device arranged to operate in accordance with the embodiments herein. Example RAN device 300 could be any type of device found in or associated with a RAN, such as a BTS, a BSC, or an MSC. For purposes of simplicity, this specification may equate RAN device 300 to a BSC from time to time. Nonetheless, it should be understood that the description of RAN device 300 could apply to any component used for the purposes described herein.

In this example, RAN device 300 includes a processor 302, a data storage 304, a network interface 306, and an input/output function 308, all of which may be coupled by a system bus 310 or a similar mechanism. Processor 302 can include one or more CPUs, such as one or more general purpose processors and/or one or more dedicated processors (e.g., application specific integrated circuits (ASICs) or digital signal processors (DSPs), etc.).

Data storage 304, in turn, may comprise volatile and/or non-volatile data storage and can be integrated in whole or in part with processor 302. Data storage 304 can hold program instructions, executable by processor 302, and data that may be manipulated by these instructions to carry out the various methods, processes, or functions described herein. Alternatively, these methods, processes, or functions can be defined by hardware, firmware, and/or any combination of hardware, firmware and software. By way of example, the data in data storage 304 may contain program instructions, perhaps stored on a non-transitory computer-readable medium, executable by processor 302 to carry out any of the methods, processes, or functions disclosed in this specification or the accompanying drawings.

Network interface 306 may take the form of a wireline connection, such as an Ethernet, Token Ring, or T-carrier connection. Network interface 306 may also take the form of a wireless connection, such as IEEE 802.11 (Wifi), BLUETOOTH®, or a wide-area wireless connection. However, other forms of physical layer connections and other types of standard or proprietary communication protocols may be used over network interface 306. Furthermore, network interface 306 may comprise multiple physical interfaces.

Input/output function 308 may facilitate user interaction with example RAN device 300. Input/output function 308 may comprise multiple types of input devices, such as a keyboard, a mouse, a touch screen, and so on. Similarly, input/output function 308 may comprise multiple types of output devices, such as a monitor, printer, or one or more light emitting diodes (LEDs). Additionally or alternatively, example RAN device 300 may support remote access from another device, via network interface 306 or via another interface (not shown), such an RS-232 or USB port.

II. CDMA Communications

For purposes of illustration, an example that uses Code Division Multiple Access (CDMA) communications will be described. However, it should be understood that other examples could use other protocols and/or functions now known or developed in the future.

In a CDMA wireless network, each wireless coverage area may employ one or more frequency bands, typically 1.25 MHz in bandwidth each, and each wireless coverage area may be distinguished from adjacent wireless coverage areas by a pseudo-random number offset ("PN offset"). Further, each wireless coverage area may concurrently communicate on multiple channels that are distinguished from one another by different CDMA codes (i.e., different Walsh codes). When a WCD operates in a given wireless coverage area, communications between the WCD and the BTS of the wireless coverage area may be carried on a given frequency and may also be encoded (e.g., modulated) by the wireless coverage area's PN offset and a given Walsh code.

Air interface communications in a wireless coverage area may be divided into forward link communications and reverse link communications. On the forward link, certain Walsh codes may be reserved for defining control channels, including a pilot channel, a sync channel, and one or more paging channels, and the remainder may be allocated dynamically for use as traffic channels, i.e., to carry bearer data such as email, web browsing, voice, video, and so on. Similarly, on the reverse link, one or more offsets of a CDMA code (i.e., offsets of a PN long code) may be reserved for defining control channels, such as access channels, and the remaining offsets may be allocated dynamically to WCDs for use as traffic channels.

Channel assignment to WCDs, which typically involves allocating one or more resources of a wireless coverage area to the WCDs, may occur when a new call (e.g., a voice, video, music, and/or data session) is established involving the WCD, or when the WCD hands off to a different wireless coverage area. Each of these scenarios are described below.

a. Idle Handoff and Call Establishment

Each BTS of a RAN may emit a pilot channel signal in each wireless coverage area the respective BTS defines. Based on these pilot channel signals, an idle WCD (e.g., a WCD not involved in a call) may associate with a primary wireless coverage area, and then listen to the paging channel of the primary wireless coverage area for incoming call indications, and other information, from the RAN. The RAN may transmit system parameter messages and/or neighbor list update messages to the WCD via this primary paging channel. These messages may identify PN offsets of the pilot channels emitted by BTSs that define neighboring wireless coverage areas (e.g., wireless coverage areas defined by the RAN's BTSs or wireless coverage areas defined by nearby BTSs in different RANs).

An idle WCD may measure the pilot channel signal strength that it receives from each of these neighboring wireless coverage areas. If, for some period of time, the WCD receives pilot channel signals from a neighboring wireless coverage area at a greater strength than the WCD receives pilot channel signals from the primary wireless coverage area, the WCD may hand off to the neighboring wireless coverage area. To do so, the WCD may stop listening to the primary wireless coverage area's paging channel and associate with the neighboring wireless coverage area. Accordingly, the WCD may begin listening to the neighboring wireless coverage area's paging channel, and may transmit a radio environment report message to the RAN, via the neighboring wireless coverage area's access channel, indicating the handoff. In this way, the neighboring wireless coverage area becomes the WCD's new primary wireless coverage area.

When the WCD seeks to engage in a voice or data call, the WCD may use the primary wireless coverage area's paging channel and access channel to set up the call. For example, when an idle WCD originates a new outgoing call (i.e., the WCD is the caller), the WCD may transmit one or more origination, or probe, messages to the RAN via the access channel of the primary wireless coverage area. The RAN may respond by assigning a forward-direction traffic channel to the WCD, and transmitting, via the paging channel, an indication of this assignment (e.g., a Walsh code of the assigned traffic channel). This transmission may take the form of a channel assignment message directed to the WCD. Then, the WCD may use the assigned traffic channel for receiving bearer traffic for the voice or data call.

On the other hand, when an idle WCD is the recipient of a new incoming call (i.e., the WCD is the callee), the RAN may transmit a page request message to the WCD on the paging channel of the primary wireless coverage area. In response to receiving the page request message, the WCD may transmit, to the RAN, a page response message via the primary wireless coverage area's access channel. Similar to how outgoing calls are set up, the RAN may respond by assigning a forward-direction traffic channel to the WCD, and transmitting, via the paging channel, an indication of this assignment (e.g., a Walsh code of the assigned traffic channel) to the WCD in a channel assignment message. Then, the WCD may use the assigned traffic channel for receiving bearer traffic.

The WCD may transmit bearer data to the RAN on a reverse traffic channel by applying the WCD's assigned PN long code offset to a PN long code. The WCD may then modulate the bearer data according to the resulting point in the PN long code.

b. Soft Handoff

During a call, a WCD may communicate substantially simultaneously via a number of "active" wireless coverage areas at a time. Herein, the term "substantially simultaneously" may be used to describe communications involving two or more discrete messages that pass through two or more different intermediate points at approximately the same time, such as within a few tens of milliseconds or less.

Depending on the type and/or configuration of the RAN, the number of active wireless coverage areas may be from one to six. However, more than six active wireless coverage areas may be used without departing from the scope of this invention. The WCD may maintain a list of the active wireless coverage areas, identified according to their PN offsets. This list may be referred to as the WCD's "active set."

A RAN may be arranged to transmit the same bearer data to a given WCD concurrently via some or all of the wireless coverage areas in the given WCD's active set, encoding each transmission according to the PN offset of the respective wireless coverage area and the Walsh code for the assigned channel therein. Correspondingly, the WCD may decode forward link transmissions from each wireless coverage area using the respective wireless coverage area's PN offset together with the WCD's respectively allocated Walsh code for the wireless coverage area. The concurrent transmissions in wireless coverage areas of the active set provides an added level of reliability to communications, as well as possibly increased quality owing to improved signal-to-noise characteristics. The concurrency also facilitates a form of seamless handoff between wireless coverage areas, referred to as "soft handoff" when the handoff is between wireless coverage areas of different BTSs, and "softer handoff" when the handoff is between wireless coverage areas of the same BTS. (For sake of simplicity, only the term "soft handoff" will be used in the following discussion.)

In addition to its active set, the WCD may maintain a list of "candidate" wireless coverage areas (typically up to six, but more is possible), which includes wireless coverage areas that are not in the WCD's active set but that have sufficient signal strength such that the WCD could demodulate signals from those wireless coverage areas. Further, the WCD may maintain a list of "neighbor" wireless coverage areas that are not in its active set or candidate set, but are in close vicinity to the WCD and deemed by the RAN to be wireless coverage areas that the WCD should monitor for eligibility as candidate wireless coverage areas. Other wireless coverage areas that are not in the WCD's active set, candidate set, or neighbor set may be members of a "remaining" set.

The WCD may continuously, or from time to time, measure the strength of each pilot channel signal that it receives and may notify the RAN when a received pilot strength is above or below designated thresholds. More particularly, the BTS may provide the WCD with a handoff direction message (HDM), which indicates (i) the PN offsets of the wireless coverage areas in the WCD's active set, and (ii) the following handoff parameters that relate to pilot signal strength:

T_ADD: Threshold pilot strength for addition to the active set (e.g., −14 decibels (dB))

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

The WCD may then monitor the pilot signals that it receives, measuring signal strength for each as $E_c/I_o$ where $E_c$ is energy per CDMA chip for the pilot signal of a given wireless coverage area and $I_o$ is the total power received. Values of $E_c/I_o$ may range from 0 dB (very good signal strength) to −16 dB (very poor signal strength). It should be understood that $E_c/I_o$ measures a signal-to-noise ratio, but other methods of measuring signal strength, as well as other ranges of signal strength values, may be used.

If the pilot signal strength of any neighbor wireless coverage area exceeds T_ADD, the WCD may add the pilot to its "candidate" set, and transmit a pilot strength measurement message (PSMM) to the BSC with information indicative of the identity of the wireless coverage area. If the pilot strength exceeds any active wireless coverage area signal by T_COMP, the BSC may then transmit an HDM to the WCD, listing the pilot as a new member of the active set. Upon receipt of the HDM, the WCD may add the pilot to its active set as instructed, and transmit a Handoff Completion Message (HCM) to the BSC, acknowledging the instruction, and providing a list of the pilots (i.e., PN offsets) in its active set. This process of the WCD adding a new wireless coverage area to its active set is a soft handoff.

If the WCD detects that the signal strength of a pilot channel in its active set drops below T_DROP, the WCD starts a handoff drop timer. If T_TDROP passes without this signal strength exceeding T_DROP, the WCD may then transmit a PSMM to the BSC, indicating the wireless coverage area and the detected $E_c/I_o$. The BSC may then respond by transmitting an HDM to the WCD, without the wireless coverage area in the active set. The WCD may then receive the HDM and responsively move the wireless coverage area to its neighbor set and transmit an HCM to the BSC.

In this way, while the WCD is actively communicating (e.g., transmitting and/or receiving bearer data), the WCD may be receiving such communications from more than one wireless coverage area. Further, as the WCD moves about or the wireless channel conditions between the WCD and its serving BTS(s) change, membership in the WCD's active set, candidate set, neighbor set, and remaining set may also change. Generally speaking, the larger the WCD's active set, the more likely it is that the WCD will receive bearer data correctly.

III. Example Codecs

As noted above, a codec may encode an analog or digital stream of information (e.g., voice, video, still images, music, data, and so on) for transmission and/or storage. For example, a source WCD may include a voice codec that receives a spoken utterance from a user, and encodes this utterance according to a particular format. The source WCD may then transmit the encoded utterance to a destination WCD. The destination WCD may include the same (or a similar) voice codec to decode the utterance from the particular format so that the destination WCD can play out the resulting signal.

Codecs may be either lossless or lossy. Lossless codecs may use an encoding format that allows the encoded media to be decoded back to its original format. Thus, lossless codecs may support high quality transmission and storage of media.

On the other hand, some codecs are lossy. Lossy codecs are typically used on media for which some degree of degradation is acceptable. For instance, compact disc audio can be compressed to about 10-20% of its size (i.e., achieving about 80-90% compression) by using an MP3 codec to discard the audio components that are beyond the auditory resolution ability of most individuals. Thus, to most listeners, music encoded in the MP3 format sounds about the same as it would if played directly from the compact disc. Similarly, voice codecs may take advantage of psychoacoustics to remove redundant or less audible components of voice signals, resulting in about 80-90% compression of voice signals.

In general, different lossy codecs may support different extents of lossy compression (e.g., some codecs will support compression with more loss than other codecs). Some lossy codecs may support multiple extents of lossy compression (e.g., a particular codec may select between two or more rates of lossy compression).

In general, there may be a roughly linear relationship between codec bit rate and the media quality that the codec produces at that bit rate. For example, a voice codec operating at 9.6 kilobits per second is likely to produce better quality voice than a voice codec operating at 4.8 kilobits per second. However, as codec technologies advance, new codecs may be introduced that are capable of supporting equal or better media quality at a lower bit rate. Thus, in some cases, a voice codec that operates at 8.5 kilobits per second may produce better voice quality than the voice codec operating at 9.6 kilobits per second. Furthermore, some voice codecs are capable of supporting multiple different encoding rates, and perhaps even switching between these rates dynamically to adapt to the characteristics of the input signal and/or to achieve a target bit rate.

In order to further illustrate these aspects of codecs, several different voice codecs are compared and contrasted below. In some examples, CDMA wireless networks may use one or more codecs from the Enhanced Variable Rate Codec (EVRC) family.

For instance, the EVRC-A codec operates on input speech signals sampled with 16-bit resolution 8,000 times per second (i.e., a sampling rate of 8,000 Hz). The resulting 128 kilobit per second stream is divided into 20 millisecond frames, each of which is compressed to either 171 bits (8.55 kilobits per second), 80 bits (4.0 kilobits per second), or 16 bits (0.8 kilobits per second). EVRC-A may also be referred to as CMDA service option 3.

The EVRC-B codec also operates on input speech signals sampled with 16-bit resolution 8,000 times per second, and supports the three compressed bit rates supported by EVRC-A. However, EVRC-B also supports a compressed frame size of 40 bits (2.0 kilobits per second). Additionally, EVRC-B supports eight operating points, each defining a target bit rate. When configured to operate at one of these operating points, EVRC-B may attempt to achieve the desired bit rate by switching between two or more of the supported frame sizes. EVRC-B may also be referred to as CMDA service option 68.

The EVRC-WB codec is a "wideband" variation of EVRC-B. Particularly, EVRC-WB operates on input speech signals sampled with 16-bit resolution at 8,000 or 16,000 times per second. When sampling at the rate of 8,000 times per second, frames encoded with EVRC-WB can be compatible with EVRC-B encodings. When sampling at 16,000 times per second, frames encoded with EVRC-WB are 171 bits (8.55 kilobit per second). However, unlike the 171 bit frames produced when sampling at 8,000 times per second, the EVRC-WB frames include high-frequency components from the 3.5 kHz to 7 kHz range. Thus, at the same bit rate, EVRC-WB may be capable of producing higher quality voice calls than EVRC-A or EVRC-B. Additionally, EVRC-WB supports two of the operating points of EVRC-B, and also supports a mode for improved encoding of non-speech signals, such as music-on-hold. EVRC-WB may also be referred to as CMDA service option 70.

The EVRC-NW codec supports at least some of the encodings of both EVRC-B and EVRC-WB. Particularly, EVRC-NW supports the sampling rates and frame sizes of EVRC-WB. Also, EVRC-WB supports seven of the operating points of EVRC-B, and also supports the mode for improved encoding of non-speech signals. Thus, EVRC-NW is fully compatible with EVRC-WB, and supports more operating modes of EVRC-B than EVRC-WB. EVRC-NW may also be referred to as CMDA service option 73.

Codecs that support a sampling rate above 8,000 Hz (e.g., EVRC-WB and EVRC-NW) may also be referred to as having a higher expected bit rate and/or as having a higher expected media quality. Codecs that support only sampling rates at or below 8,000 Hz (e.g., EVRC-A and EVRC-B) may also be referred to as having a lower expected bit rate and/or as having a lower expected media quality.

The codecs described herein are only examples. Other voice or non-voice codecs may be used instead.

The RAN may determine the codecs supported by a particular WCD in various ways. For a WCD originating a call (e.g., a caller WCD), the WCD may transmit an origination message to the RAN. This origination message may include an indication of the service options supported by the WCD. For instance, the origination message may include the WCD's preferred service option (e.g., service option 73) as well as one or more auxiliary service options (e.g., service option 3 and/or service option 68) that the WCD also supports.

For a WCD receiving a call (e.g., a callee WCD), the RAN may store or have access to a profile that includes indications of the service options supported by the WCD. This profile may also specify the WCD's preferred service option as well as one or more auxiliary service options that the WCD also supports. Thus, for an incoming call to a callee WCD, the RAN may receive an indication that a call has arrived at the RAN for the callee WCD, access the profile of the callee WCD to determine the supported codecs, and based on various factors discussed in more detail below, determine which codec to assign to the callee WCD for the call.

IV. Example Resource Management Considerations

It may be beneficial for the RAN assign a codec to a WCD, for a particular call, based on the expected resource utilization of the codec. Thus, the RAN may take into consideration the management of resources available to the RAN and the WCD when making this assignment, possibly seeking to allocate these resources in an efficient fashion.

a. RAN Utilization

For instance, the RAN may consider the utilization of at least part of the RAN infrastructure. If the utilization of a wireless coverage area serving the WCD, a wireless coverage area that is likely to serve the WCD, a BTS, a BSC, and/or a backhaul link between any RAN and/or non-RAN components is too high, it may be preferable to instruct the WCD to use a codec with a lower expected bit rate, such as EVRC-A or EVRC-B. However, if this utilization—or utilizations—is not too high, it may be preferable to allow the WCD to use a codec that supports a higher expected bit rate, and thereby potentially increasing the media quality of the call. In this latter case, the RAN may instruct the WCD to use a codec with a higher expected bit rate, such a EVRC-WB or EVRC-NW.

Determining whether the utilization is "too high" may be based on one or more utilization thresholds. For instance, the RAN may measure the utilization of a wireless coverage area serving the WCD and compare the measured utilization to a utilization threshold. If the measured utilization exceeds the utilization threshold, the RAN may instruct the WCD to use EVRC-B. Otherwise, the RAN may instruct the WCD to use EVRC-WB or EVRC-NW. The utilization threshold may be represented as a percentage, such as 30%, 40%, 50%, 60%, 70%, and so on.

b. Historical Call Length

Another factor that may influence the RAN's assignment of a codec to a WCD is the WCD's historical call length. Some WCD users tend to engage in longer calls than others. If a codec that supports a higher expected bit rate is assigned to a WCD that has exhibited long historical call lengths, RAN capacity (as well as WCD battery capacity) may be heavily utilized for a significant period of time. Rather than potentially allocating RAN capacity to the WCD for this long period of time, it may be beneficial to allocate a codec that exhibits a lower expected bit rates to such a WCD (e.g., EVRC-A or EVRC-B). On the other hand, if the WCD's historical call lengths are short, it may be advantageous to allow the WCD's user to potentially enjoy a higher media quality by allocating the WCD a codec capable of a higher expected bit rate (e.g., EVRC-WB or EVRC-NW).

To determine whether a WCD's historical call length is too long, the RAN may calculate or obtain an average of the WCD's historical call length. The historical call length may be a representation of lengths of the WCD's calls that were made over the last day, week, month, year, etc. The average may be compared to a call length threshold, such as 3 minutes, 5 minutes, 10 minutes, 30 minutes, and so on. If the average exceeds the call length threshold, the WCD's historical call length may be considered too long, but otherwise the WCD's historical call length might not be considered too long. It should be noted that an average need not be calculated and that other measures of central tendency, such as a median, and/or measures of variability, such as a standard deviation and/or an inter-quartile range, may be used in addition or instead.

c. WCD Battery Capacity

The RAN may also consider the remaining battery capacity of a WCD. As discussed previously, codecs with a higher expected bit rate may utilize a greater extent of power, and therefore a greater extent of battery capacity than other codecs. Therefore, the RAN may use a WCD's remaining battery capacity to influence the codec assigned to the WCD for a particular call. If the remaining battery capacity exceeds a threshold (e.g., 20%, 30%, 40%, 50%, and so on), the RAN may instruct the WCD to use a codec capable of a higher expected bit rate, such as EVRC-WB or EVRC-NW. If the remaining battery capacity does not exceed this threshold, then the RAN may instruct the WCD to use a codec that does not support a higher expected bit rate, such as EVRC-A or EVRC-B.

The RAN may obtain the WCD's remaining battery capacity in a number of ways. For example, the WCD may periodically, or from time to time, report its remaining battery capacity to the RAN. This remaining battery capacity may be represented as a percentage of battery capacity remaining, a number of remaining minutes of WCD operation, a number of remaining minutes that the WCD can be used to engage in calls, or another metric may be used. In some situations, the remaining battery capacity may be an estimate.

d. Likelihood of Roaming

Further, a RAN may consider a likelihood that the WCD may roam from its home wireless operator's network to a network of another wireless operator. For one or more wireless coverage areas in the home wireless operator's network, the home wireless operator may measure the rate at which calls are handed off from each of the respective wireless coverage areas to a wireless coverage area of another wireless operator. These measured rates may be stored in a table that is accessible to the RAN. The table may be updated periodically or from time to time.

If this rate for a particular wireless coverage area exceeds a roaming threshold (e.g., 10%, 20%, 30%, and so on) the RAN may determine that the particular wireless coverage area exhibits a high likelihood of roaming, and that at least some WCDs served by the particular wireless coverage area is likely to roam. Accordingly, the RAN may instruct the WCD to utilize a codec that is not capable of a higher expected bit rate (e.g., EVRC-A or EVRC-B).

There may be multiple ways through which the RAN can learn that a WCD has been handed off. For instance, during the handoff process, the WCD may inform the RAN of the wireless coverage area to which the WCD is being handed off. Alternatively, the RAN may receive, from the wireless operator that controls the wireless coverage area to which the WCD is handed off, signaling messages indicating that the WCD has been handed off to that wireless coverage area.

However, if the RAN does not receive an explicit indication that the WCD was handed off, the RAN may infer that a handoff occurred. For example, the WCD may be taking part in a call via a wireless coverage area of the WCD's home wireless service provider (a "home wireless coverage area"). The RAN may receive an indication that a call leg between the RAN and the WCD was terminated, and may record the time of the termination, as well as the caller, callee, an identifier of the home wireless coverage area, and related information. (It should be understood that a call leg is segment of a call between two endpoints. Thus, when the WCD is handed off from a first BTS to a second BTS, the WCD may maintain the end-to-end call, but replace the call leg between the WCD and the first BTS with a call leg between the WCD and the second BTS.) At a later point in time (e.g., minutes, hours, or days after the call was terminated), the home wireless service provider may receive records of call legs and/or calls engaged in by the home wireless service provider's subscribed WCDs in other wireless operators' wireless coverage areas. These records may take the form of call detail records (CDRs).

By correlating these received records with similar records recorded by the RAN, the home wireless service provider may be able to determine whether a WCD that took part in a call via the home wireless coverage area was handed off to a wireless coverage area of another wireless operator (a "roaming wireless coverage area"). For instance, the RAN may compare the caller and callee of a terminated call leg that took place in the WCD's home wireless service provider's wireless coverage area to the caller and callee of call leg that subsequently took place in the roaming wireless coverage area. If the parties that took part in these calls are the same, this may indicate that the call was handed off from the home wireless coverage area to the roaming wireless coverage area, or that the call was dropped during the course of such a handoff, and then reestablished via the roaming wireless coverage area. Regardless, if the time between the call being terminated in the home wireless coverage area and a corresponding call being initiated in the roaming wireless coverage area is below a threshold value, the RAN may consider these events to be a "handoff."

The communication of CDRs to the home service provider may be directly from another wireless operator or may take place via a third party billing aggregator. The records may be formatted according to Transferred Account Procedure (TAP) or Cellular Intercarrier Billing Exchange Roamer (CIBER). Such records may comprise call detail records for each call or call leg made by a roaming WCD, including the WCD's location, the calling party, the called party, the time of the call, and the duration of the call.

V. Example Operations

Figure 4:
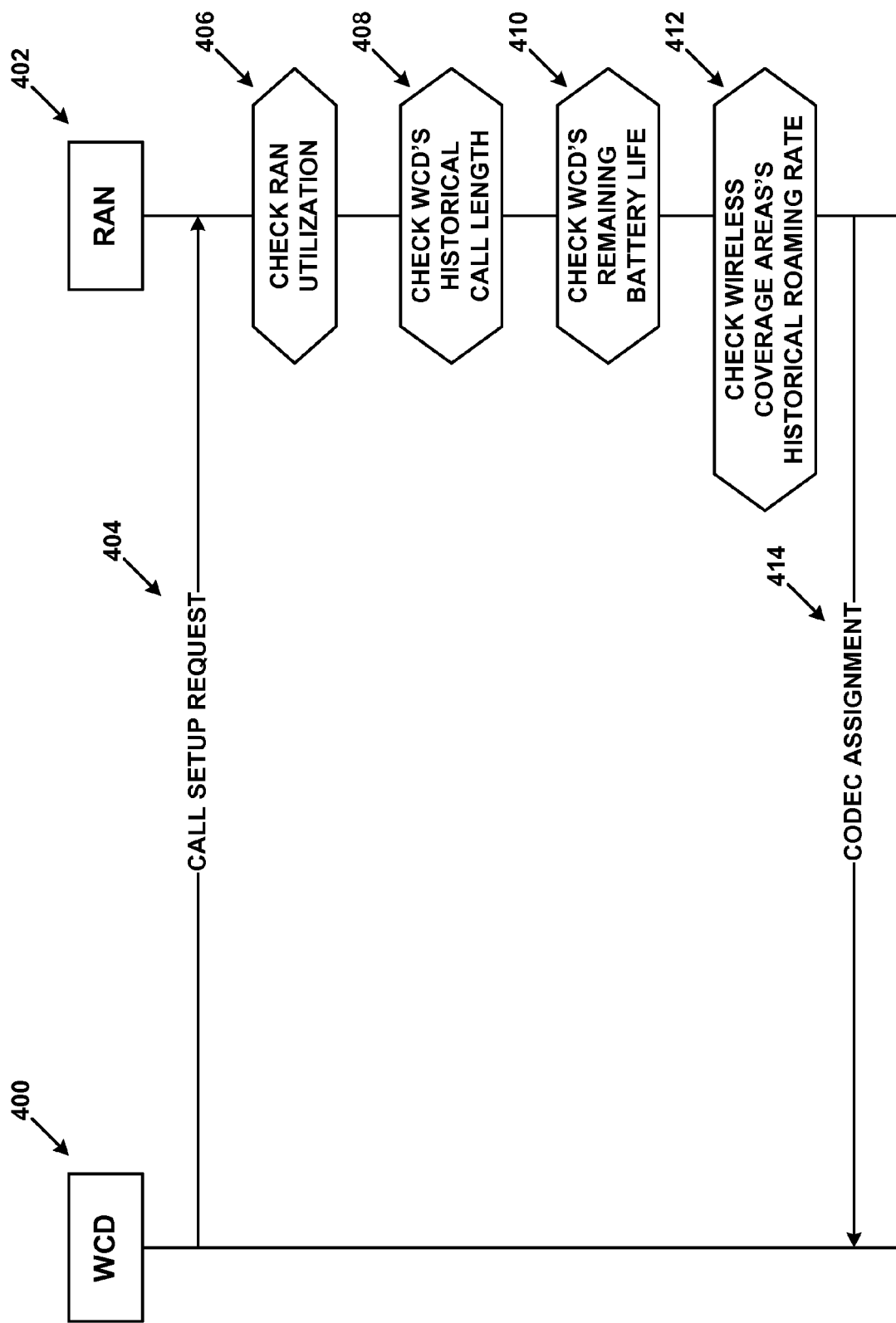
FIG. 4 is a message flow, in accordance with an example embodiment.

FIG. 4 depicts an example message flow that illustrates possible embodiments. The message flow involves WCD 400 and RAN 402. It is assumed that WCD 400 can support both a codec with a higher expected bit rate (e.g., EVRC-WB and/or EVRC-NW), as well as a codec that does not support a higher expected bit rate (e.g., EVRC-A and/or EVRC-B).

At step 404, WCD 400 may transmit a call setup request to RAN 402. Receipt of this request may result in RAN 402 carrying out one or more checks to determine which codec to instruct WCD 400 to use. These checks may involve operations similar to, the same as, and/or based on the procedures described in the previous section. In other embodiments, the RAN may receive an indication that a call has arrived at the RAN for a callee WCD, access the profile of the callee WCD to determine the supported codecs, and based on the outcome of these checks, determine which codec to assign to the callee WCD for the call.

For instance, at step 406, RAN 402 may check the utilization of one or more components of RAN 402. At step 408, RAN 402 may check the historical call length of WCD 400. At step 410, RAN 402 may check the remaining battery capacity of WCD 400. At step 412, RAN 402 may obtain, determine, or estimate the likelihood that WCD 400 will roam to another wireless service provider's network.

If the outcome of any one or more of the checks performed at steps 406 through 412 indicate that the WCD should be assigned a codec that only supports a lower expected bit rate, RAN 402 may assign this codec to WCD 400 at step 414. On the other hand, if the outcome indicates that the WCD should be assigned a codec that supports a higher expected bit rate, the RAN will assign that codec to WCD 400 instead. Step 414 may involve RAN 402 transmitting a representation of the assigned codec (e.g., a number or some other value indicating the assigned codec) to WCD 400.

In some embodiments, more or fewer checks may be made before a codec is assigned to a WCD. For example, RAN 402 may perform as little as one of the checks represented by steps 406 through 412. Alternatively, more checks may be performed, possibly including checks not explicitly discussed herein.

Figure 5:
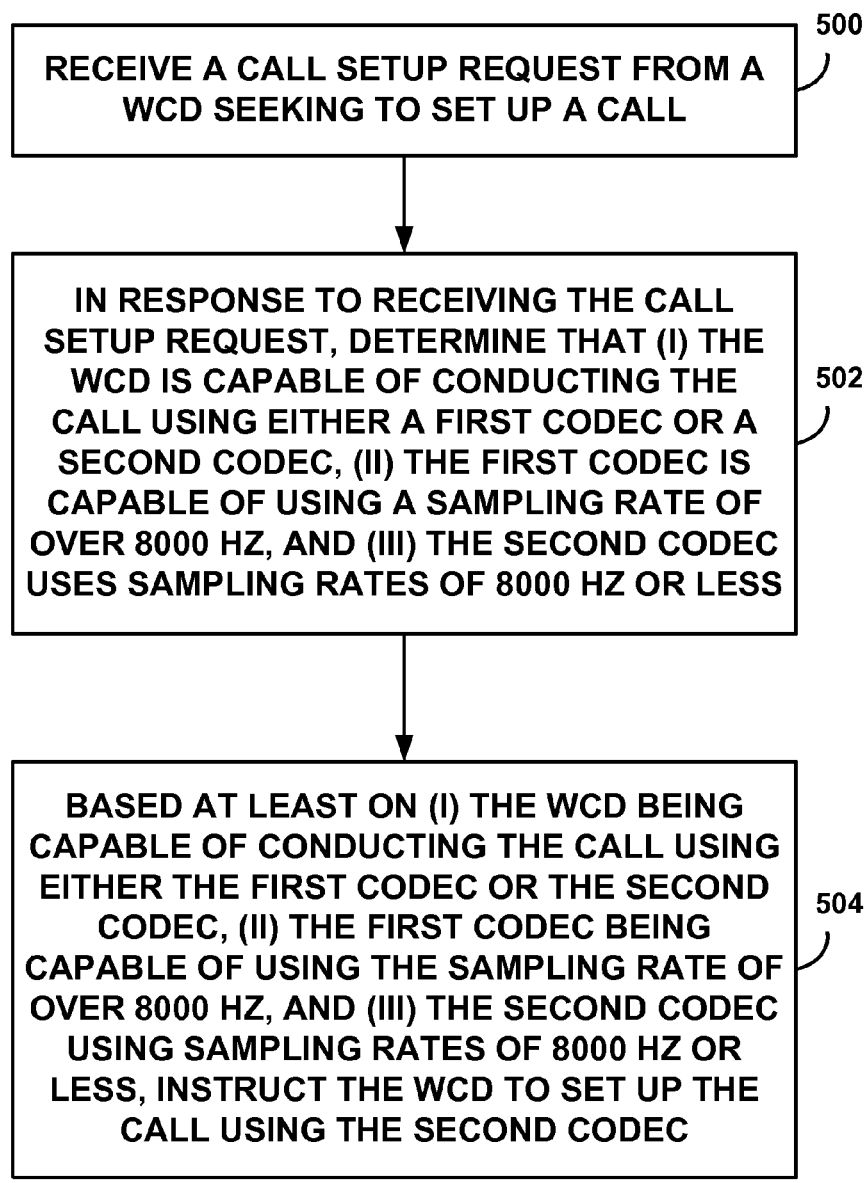
FIG. 5 is a flow chart, in accordance with an example embodiment.

FIG. 5 is a flow chart depicting another example embodiment. One or more steps of FIG. 5 may be carried out by a RAN component exemplified by RAN device 300.

At step 500, a RAN device may receive a call setup request from a WCD seeking to set up a call. At step 502, possibly in response to receiving the call setup request (e.g., an origination message), it may be determined that (i) the WCD is capable of conducting the call using either a first codec or a second codec, (ii) the first codec is capable of using a sampling rate of over 8,000 Hz, and (iii) the second codec uses sampling rates of 8,000 Hz or less. This determination may be made in part by examining codecs supported by the WCD, as indicated by the call setup request. Alternatively, for an incoming call to a callee WCD, the RAN may receive an indication that a call has arrived at the RAN for the callee WCD, and access the profile of the callee WCD to determine the supported codecs.

The call may be a voice call, and the first codec may be capable of producing higher voice quality voice calls than the second codec. For instance, the first codec may be capable of producing the higher voice quality voice calls at a lower bit rate than the second codec.

At step 504, based at least on (i) the WCD being capable of conducting the call using either the first codec or the second codec, (ii) the first codec being capable of using the sampling rate of over 8,000 Hz, and (iii) the second codec using sampling rates of 8,000 Hz or less, the WCD may be instructed to set up the call using the second codec.

The RAN device may be a component of a RAN, and the WCD may be served by the RAN. It may be further determined that a utilization of at least part of the RAN exceeds a utilization threshold. Based also on the utilization exceeding the utilization threshold, the WCD may be instructed to set up the call using the second codec.

Alternatively or additionally, it may be determined that historical call lengths of the WCD exceed a call length threshold. Based also on the historical call lengths exceeding the call length threshold, the WCD may be instructed to set up the call using the second codec. Determining that the historical call lengths exceed the call length threshold may involve determining that an average of the historical call lengths exceeds the call length threshold.

In some embodiments, a remaining battery capacity of the WCD may be obtained. It may be determined that the remaining battery capacity is below a battery capacity threshold. Based also on the remaining battery capacity being below the battery capacity threshold, the WCD may be instructed to set up the call using the second codec.

Optionally, it may be determined that a wireless coverage area serving the WCD has a historical roaming rate that is above a roaming rate threshold. The wireless coverage area may be operated by a service provider, and the historical roaming rate may represent how frequently, in the past, WCDs served by the wireless coverage area roamed from the wireless coverage area to wireless coverage areas operated by other service providers. Based also on the historical roaming rate being above the roaming rate threshold, the WCD may be instructed to set up the call using the second codec.

Further, it may be determined that the first codec is capable of supporting a larger range of bit rates than the second codec. Based also on the first codec being capable of supporting the larger range of bit rates than the second codec, the WCD may be instructed to set up the call using the second codec.

FIG. 6 is a flow chart depicting yet another example embodiment. One or more steps of FIG. 6 may be carried out by a RAN component exemplified by RAN device 300.

At step 600, a RAN device may receive a call setup request from a WCD seeking to set up a call. The WCD may be capable of conducting the call using either a first codec or a second codec. The first codec may be capable of using a sampling rate of over 8,000 Hz, and the second codec may use sampling rates of 8,000 Hz or less. The WCD's supported codecs may be determined from examination of the call setup request. Alternatively, for an incoming call to a callee WCD, the RAN may receive an indication that a call has arrived at the RAN for the callee WCD, and access the profile of the callee WCD to determine the supported codecs.

At step 602, in response to receiving the call setup request, a determination may be made that (i) a utilization of at least part of the RAN does not exceed a utilization threshold, (ii) historical call lengths of the WCD do not exceed a call length threshold, (iii) a remaining battery capacity of the WCD is not below a battery capacity threshold, and (iv) a wireless coverage area serving the WCD has a historical roaming rate that is not above a roaming rate threshold. The wireless coverage area may be operated by a service provider, and the historical roaming rate may represent how frequently, in the past, WCDs served by the wireless coverage area roamed from the wireless coverage area to wireless coverage areas operated by other service providers.

At step 604, in response to making the determination, the WCD may be instructed to set up the call using the first codec. In some embodiments, the call may be a voice call. The first codec may be capable of producing higher voice quality voice calls than the second codec at a lower bit rate than the second codec.

It should be understood that FIGS. 4, 5, and 6 depict non-limiting embodiments. Thus, more or fewer steps than shown in FIGS. 4, 5, and 6 may be used without departing from the scope of the embodiments herein. Additionally, some of these steps may be repeated one or more times, or may be omitted altogether. Further, the message flows and flow charts of these figures may be combined with one another and/or with other aspects described this specification and its accompanying drawings, in whole or in part, also without departing from the scope of the embodiments herein. For instance, any of the additional features discussed in the context of FIG. 6 may also be applied to features disclosed in the context of FIGS. 4 and 5.

In the drawings, a step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by one or more processors for implementing specific logical functions or actions in the method or technique. The program code and/or related data may be stored on any type of computer-readable medium, such as a storage device, including a disk drive, a hard drive, or other storage media.

VI. Conclusion

Example embodiments have been described above. Those skilled in the art will understand, however, that changes and modifications may be made to these embodiments without departing from the true scope and spirit of the invention, which is defined by the claims.

What is claimed is:

1. A method comprising: receiving, by a radio access network (RAN) device, a call setup request from a wireless communication device (WCD) seeking to set up a call; determining that a wireless coverage area serving the WCD has a historical roaming rate that is above a roaming rate threshold, wherein the wireless coverage area is operated by a service provider, and wherein the historical roaming rate represents how frequently, in the past, WCDs served by the wireless coverage area roamed from the wireless coverage area to wireless coverage areas operated by other service providers; in response to receiving the call setup request from the WCD, the RAN device determining that (i) the WCD is configured to conduct the call using either a first codec or a second codec, (ii) the first codec supports using a sampling rate of over 8,000 Hz, and (iii) the second codec uses sampling rates of 8,000 Hz or less; and based at least on (i) the WCD being configured to conduct the call using either the first codec or the second codec, (ii) the first codec supporting using the sampling rate of over 8,000 Hz, (iii) the second codec using sampling rates of 8,000 Hz or less, and (iv) the historical roaming rate being above the roaming rate threshold, the RAN device instructing the WCD to set up the call using the second codec.

2. The method of claim 1, wherein the call is a voice call, and wherein the first codec is configured to produce higher voice quality voice calls than the second codec.

3. The method of claim 2, wherein the first codec is configured to produce the higher voice quality voice calls at a lower bit rate than the second codec.

4. The method of claim 1, wherein the RAN device is a component of a RAN, wherein the WCD is served by the RAN, the method further comprising:
determining that a utilization of at least part of the RAN exceeds a utilization threshold; and
based also on the utilization exceeding the utilization threshold, instructing the WCD to set up the call using the second codec.

5. The method of claim 1, further comprising:
determining that historical call lengths of the WCD exceed a call length threshold; and
based also on the historical call lengths exceeding the call length threshold, instructing the WCD to set up the call using the second codec.

6. The method of claim 5, wherein determining that the historical call lengths exceed the call length threshold comprises determining that an average of the historical call lengths exceeds the call length threshold.

7. The method of claim 1, further comprising:
obtaining a remaining battery capacity of the WCD;
determining that the remaining battery capacity is below a battery capacity threshold; and
based also on the remaining battery capacity being below the battery capacity threshold, instructing the WCD to set up the call using the second codec.

8. The method of claim 1, further comprising:
determining that the first codec supports a larger range of bit rates than the second codec; and
based also on the first codec supporting the larger range of bit rates than the second codec, instructing the WCD to set up the call using the second codec.

9. An article of manufacture including a non-transitory computer-readable medium, having stored thereon program instructions that, upon execution by a radio access network (RAN) device, cause the RAN device to perform operations comprising: receiving a call setup request from a wireless communication device (WCD) seeking to set up a call; determining that a wireless coverage area serving the WCD has a historical roaming rate that is above a roaming rate threshold, wherein the wireless coverage area is operated by a service provider, and wherein the historical roaming rate represents how frequently, in the past, WCDs served by the wireless coverage area roamed from the wireless coverage area to wireless coverage areas operated by other service providers; in response to receiving the call setup request, determining that (i) the WCD is configured to support the call using either a first codec or a second codec, (ii) the first codec supports using a sampling rate of over 8,000 Hz, and (iii) the second codec uses sampling rates of 8,000 Hz or less; and based at least on (i) the WCD being configured to support the call using either the first codec or the second codec, (ii) the first codec supporting using the first sampling rate of over 8,000 Hz, (iii) the second codec using sampling rates of 8,000 Hz or less, and (iv) the historical roaming rate being above the roaming rate threshold, instructing the WCD to set up the call using the second codec.

10. The article of manufacture of claim 9, wherein the call is a voice call, and wherein the first codec is configured to produce higher voice quality voice calls than the second codec.

11. The article of manufacture of claim 10, wherein the first codec is configured to produce the higher voice quality voice calls at a lower bit rate than the second codec.

12. The article of manufacture of claim 9, wherein the RAN device is a component of a RAN, wherein the WCD is served by the RAN, the operations further comprising:
determining that a utilization of at least part of the RAN exceeds a utilization threshold; and
based also on the utilization exceeding the utilization threshold, instructing the WCD to set up the call using the second codec.

13. The article of manufacture of claim 9, the operations further comprising:
determining that historical call lengths of the WCD exceed a call length threshold; and
based also on the historical call lengths exceeding the call length threshold, instructing the WCD to set up the call using the second codec.

14. The article of manufacture of claim 13, wherein determining that the historical call lengths exceed the call length threshold comprises determining that an average of the historical call lengths exceeds the call length threshold.

15. The article of manufacture of claim 9, the operations further comprising:

obtaining a remaining battery capacity of the WCD;

determining that the remaining battery capacity is below a battery capacity threshold; and based also on the remaining battery capacity being below the battery capacity threshold, instructing the WCD to set up the call using the second codec.

16. The article of manufacture of claim 9, the operations further comprising:

determining that the first codec supports a larger range of bit rates than the second codec; and based also on the first codec supporting the larger range of bit rates than the second codec, instructing the WCD to set up the call using the second codec.

17. A method comprising:

receiving, by a radio access network (RAN) device, a call setup request from a wireless communication device (WCD) seeking to set up a call, wherein the WCD is configured to conduct the call using either a first codec or a second codec, and wherein the first codec is supports a sampling rate of over 8,000 Hz, and the second codec uses sampling rates of 8,000 Hz or less;

in response to receiving the call setup request from the WCD, the RAN device making a determination that (i) a utilization of at least part of the RAN does not exceed a utilization threshold, (ii) historical call lengths of the WCD do not exceed a call length threshold, (iii) a remaining battery capacity of the WCD is not below a battery capacity threshold, and (iv) a wireless coverage area serving the WCD has a historical roaming rate that is not above a roaming rate threshold, wherein the wireless coverage area is operated by a service provider, and wherein the historical roaming rate represents how frequently, in the past, WCDs served by the wireless coverage area roamed from the wireless coverage area to wireless coverage areas operated by other service providers; and in response to making the determination, the RAN device instructing the WCD to set up the call using the first codec.

18. The method of claim 17, wherein the call is a voice call, wherein the first codec is configured to produce higher voice quality voice calls than the second codec at a lower bit rate than the second codec.

* * * * *